March 17, 1964  K. SECUNDA  3,125,208
MULTIPLE BOWL VIBRATORY FEEDING APPARATUS
Filed Oct. 9, 1961
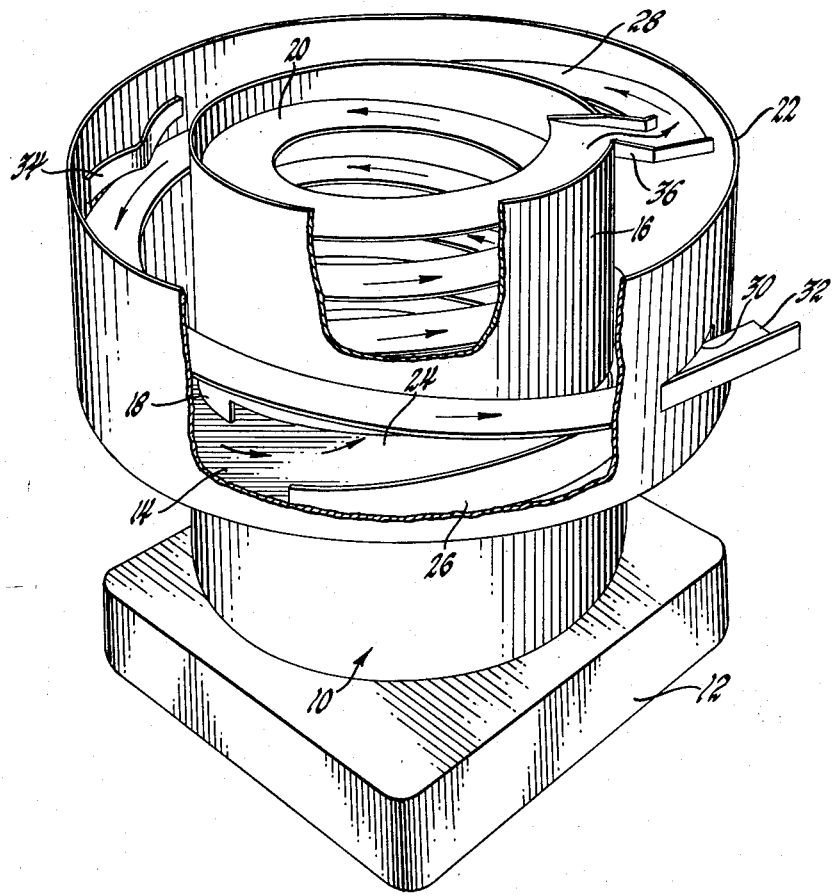
INVENTOR.
Kenneth Secunda
BY
Paul J. Leising
ATTORNEY

3,125,208
MULTIPLE BOWL VIBRATORY FEEDING APPARATUS

Kenneth Secunda, Detroit, Mich., assignor to General Motors Corporation, Detroit, Mich., a corporation of Delaware
Filed Oct. 9, 1961, Ser. No. 143,818
6 Claims. (Cl. 198—33)

This invention relates to vibratory feeder bowl apparatus and more particularly to vibratory feeder bowl apparatus wherein a plurality of feeding bowls and feed tracks are utilized to increase feeding capacity.

In conventional manufacturing practice, it is often desirable to feed articles from a common mass to article receiving means in a predetermined condition. Conventional vibratory feeders of the type to which the present invention relates comprise feeding bowls which are mounted on or otherwise connected to vibration creating mechanism. A helical track is formed along the inner periphery of the bowl and leads from the bottom of the bowl to an exit port at the top of the bowl. A mass of articles are placed in the bottom of the bowl and individual articles are driven upwardly on the track by vibration. Orientation means are provided on the track to orient the articles traveling therealong to a predetermined position and to displace articles which fail to acquire the predetermined position from the track. The displaced articles fall back into the common mass at the bottom of the bowl.

Since many of the articles being moved along the track fail to acquire the predetermined position and are displaced back into the bowl, the actual article output of the feeding mechanism is less than the theoretical maximum capacity thereof. Maximum feeding capacity can be obtained when all of the articles on the track, at a given time, will obtain the predetermined position and when there are no gaps on the track caused by displacement of unoriented articles. In conventional apparatus, the displacement of a large number of articles from the track can seriously disrupt the normal feeding cycle and result in periods when no articles are being discharged from the feeding apparatus. Consequently the over-all feed rate will be low.

Accordingly, the objects of the present invention are: to provide vibratory feed mechanism from which articles being fed will be discharged continuously at maximum output capacity of the apparatus; to provide new and improved vibratory feed mechanism having substantially increased feed rates; to provide improved vibratory feeding mechanism wherein the articles being fed travel and orient faster than in conventional mechanism; to provide an improved vibratory feeder device having first track means upon which articles are moved upwardly from a common mass to a second track means upon which articles are moved downwardly so that the articles thereon are assisted by gravity during downward movement; and to provide a compact multiple bowl vibratory feeder wherein each bowl is operated by common vibration creating mechanism.

Other objects and advantages of the present invention will be apparent to those skilled in the art by reference to the following detailed description of an illustrative embodiment of the present invention which is shown in the accompanying drawing comprising a perspective view of apparatus embodying the principles of the present invention.

In general, the present invention comprises a substantially conventional vibrating bowl feeder having means to store a mass of articles at the bottom thereof and having an upwardly extending spiral trackway formed along the rim thereof. A conventional vibratory base supports the vibrating bowl feeder to drive articles from the common mass at the bottom thereof upwardly along the spiral trackway, to the top of the feeder. Another bowl is concentrically mounted about the aforementioned bowl and is provided with a downwardly extending spiral trackway. The upwardly extending spiral trackway is connected to the downwardly extending spiral trackway which is adapted to carry parts downwardly to article receiving means located therebelow. Baffle means for orienting the articles and removing unoriented articles from the track are provided on the downwardly extending spiral track. The outer vibrating bowl feeder is connected through passageways in the side of the inner bowl so that articles which are removed from the downwardly extending spiral track by the baffle means are returned to the common mass. The upwardly extending spiral trackway of the inner vibrating hopper feeder is substantially wider than the downwardly extending spiral track of the outer vibrating hopper feeder. The width of the tracks varies because the feed rate of articles traveling up the inner spiral track is less than the feed rate of articles moving down the outer spiral track due to gravity retardation on the inner track and gravity assist on the outer track. The inner track is made wide enough to oversupply articles to the outer track to the extent necessary to insure that a continuous flow of articles reaches the article receiving means at the end of the outer track. The amount of oversupply of articles to the outer track will be a function of the feed rate thereon and the number of articles which are displaced from the track by the baffle means.

Referring now to the drawing, a conventional vibrator which can be driven electrically or mechanically is supported on a base 12 that together with the vibrator forms the vibrating mechanism. A dish shaped base plate is suitably connected to the vibrator 10 with a cylindrically shaped inner feeder bowl 16 fixedly secured to the plate at one end 18 of the bowl by conventional means, such as welding. The bowl 16 is provided with an upwardly extending spiral track 20 which extends from the bottom of the bowl to the top along the inner periphery of the bowl, as is conventional. An outer vibratory bowl feeder 22 is concentrically mounted circumjacent the inner bowl 16, and terminates in abutting engagement with the outer periphery of the plate 14 where it is fixedly secured thereto by conventional means, such as welding. In this manner actuation of the vibration mechanism causes similar vibration of the inner vibratory bowl feeder 16 and the outer vibratory bowl feeder 22. In the area located between the bowls, the plate 14 extends downwardly towards the inner bowl 16 so as to provide an inclined surface for returning articles to the inner bowl via a passageway 24 formed in the side of the inner bowl 16 adjacent a gate 26.

The outer bowl 22 is provided with a downwardly extending spiral trackway 28 which extends downwardly around the inner periphery of the bowl to an exit port 30 and a track extension 32 from which articles are to be delivered in a predetermined position to article receiving means, such as an assembly fixture or the like. Baffle means 34 are associated with the trackway 28 to orient articles traveling therealong in a predetermined manner and to displace articles from the trackway which fail to acquire the predetermined orientation as is well known in the art. Articles which are displaced by the baffle means 34 fall between the bowls onto the inclined surface and are moved therealong through the passage 24 to be returned to the common mass of articles in the bowl 16. It is to be understood that the orienting and baffle means 34 shown is intended to be merely illustrative, since each type of article conveyed in vibratory bowl mechanisms requires specially designed orienting devices and baffle means. The upwardly extending spiral track 20 is connected at its upper end by bridging means 36 to the upper end of the downwardly extending spiral trackway 28. The width of the trackway 20 is substantially greater than the width of the trackway 28 so that a greater number of articles can be moved along the trackway 20 than can be moved along the trackway 28. However, the actual rate of travel of articles is greater on the trackway 28 than on the trackway 20 because of the fact that the articles moved upwardly on the track 20 are retarded by gravity whereas the articles moved downwardly on the track 28 are assisted by gravity. The rates of feed on each track are dependent on the inclination thereof. The rate of feed on the downwardly extending trackway 28 can be very substantially increased by increasing the inclination thereof. The amount of inclination of the trackway 28 will be dependent on the type of article being conveyed and the type of orientation being imparted thereto by the orienting and baffle means along the trackway.

In operation, a mass of articles is placed on the bottom of the inner bowl 16. Actuation of the vibrator 10 drives articles up the spiral trackway 20 from the common mass in a conventional manner. The number of articles which are removed from the common mass in a given time period depends on the rate of feed of the articles along the track 20 and the surface area of the track available to support the articles being conveyed. Accordingly, the track 20 is made wide enough to insure an oversupply of articles to the bridging means 36 for reasons to be hereinafter set forth more fully. When the articles reach the top of the track 20, they are transferred across the bridging means 36 and onto the downwardly extending track 28. The rate of feed on the downwardly extending track 28 is substantially greater than the rate of feed on the upwardly extending track 20. Consequently a greater number of articles will be moved down the track in a given unit of time than could be moved up a track of similar width in the vibratory bowl 16. As the articles are moved down the track 28, they are oriented in a predetermined manner and those articles which fail to acquire the predetermined orientation are displaced from the trackway by baffle means 34 onto the plate 14 wherefrom they are directed by the gate 26 to the bowl 16. The oversupply of articles conveyed to the bridging means 36 is of a quantity which will compensate for the increased rate of feed on the track 28 and displacement of unoriented articles therefrom. In this manner, a continuous flow of articles will be delivered to the article receiving means at rates of speed which are greatly increased over speeds attainable in prior practice where the articles were delivered from the top of the trackway 14 to the article receiving means.

In this respect, experiments have shown that a normal feed rate of a vibratory bowl, of approximately 120 inches per minute, can be more than doubled to a rate of approximately 300 inches per minute by utilization of the principles of the present invention. The aforementioned increase in feed rate was obtained with a declining track having approximately a three degree declination. Feed rates can be increased even further by increasing the declination where possible and also by increasing the height of the inner bowl relative to the outer bowl so that a steeper decline would be provided. As previously described, the vibratory bowl unit has a completely independent circulation system due to the shape of the plate surface whereby articles falling off of any of the tracks are recirculated into the common mass of articles in the center of the inner bowl by means of baffles and passages connecting the inner and outer bowls.

It is intended that the scope of the present invention, as defined by the appended claims, shall include all obvious modifications in the details of construction and the arrangement of the parts, except insofar as limited by the prior art.

The invention claimed is:

1. In vibratory feeding apparatus for feeding articles from a common mass to individual article receiving means: an inner feed bowl, a first feed track extending upwardly from the bottom of said inner feed bowl to the top thereof, an outer feed bowl concentrically mounted relative to said inner feed bowl, a second feed track extending downwardly from the top of said outer feed bowl to the bottom thereof, bridge means connecting said first feed track with said second feed track, and vibratory means supporting said inner feed bowl and said outer feed bowl and adapted to drive articles from within said inner feed bowl, upwardly along said first feed track and across said bridging means and downwardly along said second feed track to the article receiving means.

2. The apparatus as defined in claim 1 and wherein said first feed track is wider than said second feed track to enable a larger volume of articles to be moved therealong and to compensate for increased feed rates of articles on said second track as compared with feed rates on said first feed track.

3. The apparatus as defined in claim 1 and wherein baffle means are provided to return articles which are not oriented in a predetermined manner to the common mass of articles prior to delivery to said article receiving means, said baffle means being located only on said second feed track so that the number of articles delivered by said first feed track to said second feed track will exceed the number of articles reaching said article receiving means by an amount at least equal to the number of articles removed by said baffle means.

4. The apparatus as defined in claim 3 and wherein said inner bowl includes means for interconnecting said inner bowl and said outer bowl whereby articles displaced from said second feed track by said baffle means are returned to the common mass of articles in the bottom of said inner bowl.

5. In vibratory feeding apparatus for feeding articles from a common mass to article receiving means: a first vibratory bowl, container means adapted to receive a mass of articles in said first vibratory bowl, a first feed track provided in said first vibratory bowl and extending upwardly from said container means, a second vibratory bowl, a second feed track provided in said second vibratory bowl and extending downwardly relative to said first feed track, vibratory means associated with said first vibratory bowl and said second vibratory bowl to drive articles up said first track means and down said second track means, connecting track means between said first track means and said second track means whereby articles from said common mass may be driven up said first trackway to said connecting track means at one rate of speed and carried downwardly on said second trackway at an increased rate of speed, baffle means to prevent improperly oriented articles from reaching said article receiving means, said baffle means being associated with said second feed track to displace improperly oriented articles from said second feed track, and means provided in said second vibratory bowl to return articles displaced from said second feed track to the common mass in said first vibratory feed bowl.

6. In vibratory feeding apparatus for feeding articles from a common mass to article receiving means: a first vibratory bowl, container means adapted to receive a mass of articles in said first vibratory bowl, a first feed track provided in said first vibratory bowl and extending upwardly from said container means, a second vibratory bowl, a second feed track provided in said second vibratory bowl and extending downwardly relative to said first feed track, vibratory means associated with said first vibratory bowl and said second vibratory bowl to drive articles up said first track means and down said second track means, connecting track means between said first track means and said second track means whereby articles from said common mass may be driven up said first trackway to said connecting track means at one rate of speed and carried downwardly on said second trackway at an increased rate of speed, baffle means to prevent improperly oriented articles from reaching said article receiving means, said baffle means being associated with said second feed track to displace improperly oriented articles from said second feed track, and means provided in said second vibratory bowl to return articles displaced from said second feed track to the common mass in said first vibratory feed bowl, said last mentioned means comprising a downwardly and inwardly sloping bottom surface located beneath said baffle means, a passageway connecting said first vibratory bowl and said second vibratory bowl, and gate means to direct articles displaced from said second trackway and traveling downward on said bototm surface through said passageway and into said first vibratory bowl.

References Cited in the file of this patent

UNITED STATES PATENTS

| | | |
|---|---|---|
| 1,078,917 | Gray | Nov. 18, 1913 |
| 2,654,465 | Sgriccia | Oct. 6, 1953 |
| 2,765,900 | Seabrooke | Oct. 9, 1956 |